United States Patent [19]

Shanlever, Jr.

[11] Patent Number: 5,474,678

[45] Date of Patent: Dec. 12, 1995

[54] IN-LINE FILTER IN A STARTING FLUID INJECTION SYSTEM

[75] Inventor: Rufus C. Shanlever, Jr., Crystal Lake, Ill.

[73] Assignee: Kold Ban International, Ltd., Lake in the Hills, Ill.

[21] Appl. No.: 252,084

[22] Filed: Jun. 1, 1994

[51] Int. Cl.⁶ .................................................. B01D 35/027
[52] U.S. Cl. ...................... 210/416.4; 210/438; 210/451; 210/460; 210/463; 123/179.1
[58] Field of Search ............................ 123/179.1, 179.8, 123/179.16; 210/416.4, 438, 441, 446, 447, 448, 449, 451, 452, 457, 459, 460, 461, 463, 497.01, 510.1, 232

[56] References Cited

U.S. PATENT DOCUMENTS

| | | | |
|---|---|---|---|
| 4,202,309 | 5/1980 | Burke | 123/179.1 |
| 4,326,485 | 4/1982 | Burke | 123/179.1 |
| 4,346,683 | 8/1982 | Burke | 123/179.1 |
| 4,477,352 | 10/1984 | Pappas | 210/452 |
| 4,759,842 | 7/1988 | Frees et al. | 210/446 |
| 5,062,952 | 11/1991 | Neuman | 210/446 |

*Primary Examiner*—Robert A. Dawson
*Assistant Examiner*—W. L. Walker
*Attorney, Agent, or Firm*—Willian Brinks Hofer Gilson & Lione

[57] ABSTRACT

A starting fluid injection system includes an in-line filter having a body and a filter element. The body defines a passageway extending between the ends of the body and a set of threads formed around the passageway intermediate the ends. The filter element includes a tubular shaft that is threadedly received in the set of threads and a filter mounted to the tubular shaft remote from the set of threads. The tubular shaft is dimensioned to create an annular chamber between the shaft and the body and the annular chamber is in fluid communication with the exterior of the filter portion.

11 Claims, 2 Drawing Sheets

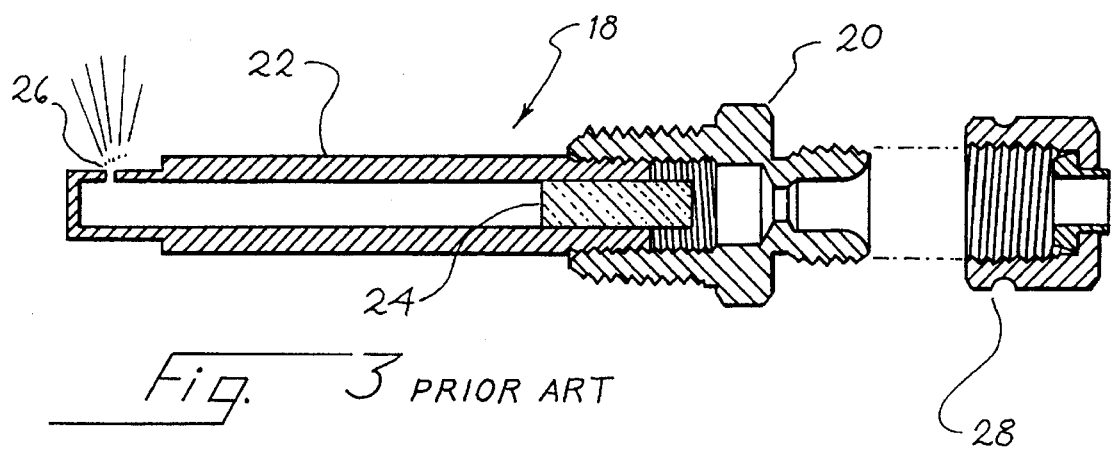
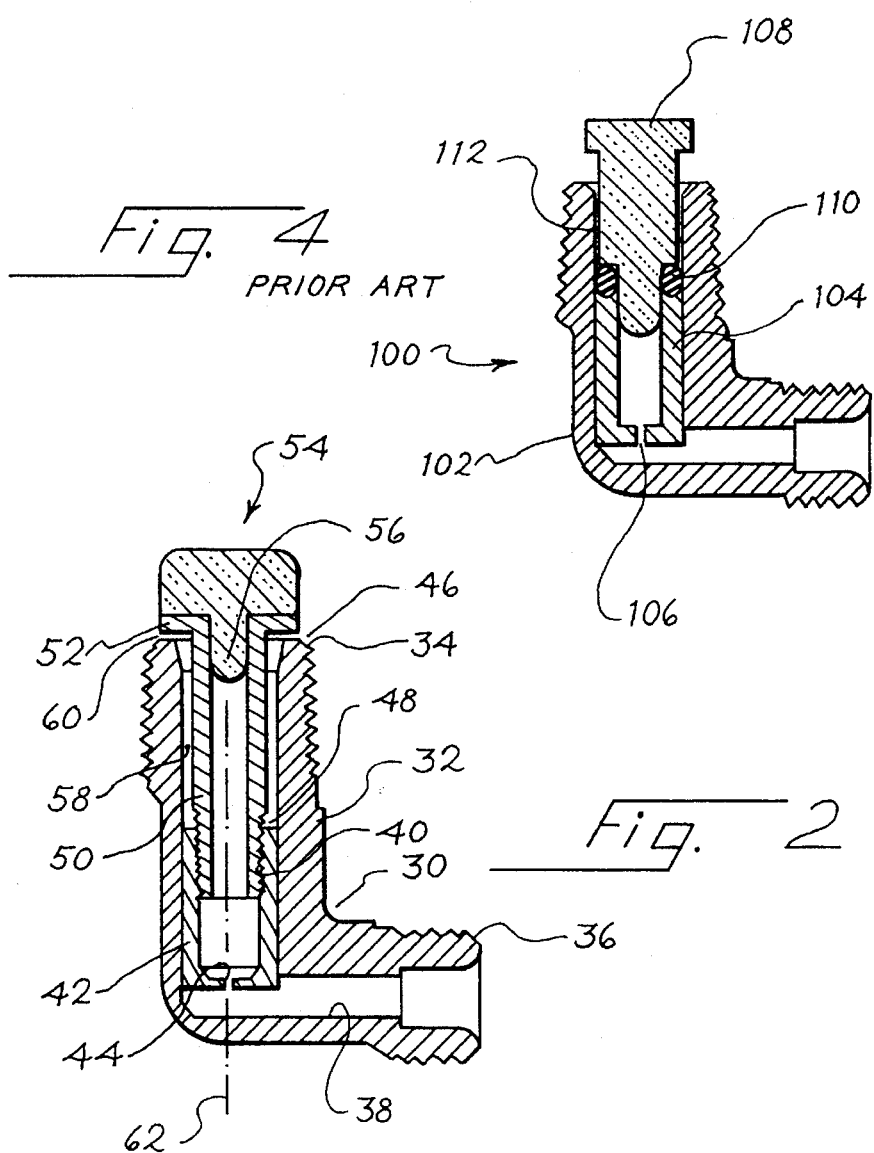

IN-LINE FILTER IN A STARTING FLUID INJECTION SYSTEM

BACKGROUND OF THE INVENTION

This invention relates to an in-line filter, and in particular to an in-line filter for a starting fluid injection system of the type having a starting fluid canister valve, a conduit coupled to the valve, and an atomizer coupled to the conduit.

In-line filters of the general type described above are conventional. One prior art in-line filter is shown in FIG. 4. This in-line filter 100 includes a body 102 that defines a central passageway. A cup 104 is mounted in the body 102, and the cup 104 defines an orifice 106. A filter element 108 is held by friction in the passageway by an O-ring 110. The entire filter element is formed in one piece of sintered porous bronze, and an annular chamber 112 is provided between the filter element 108 and the body 102 to increase the surface area of the filter element 108.

The prior art in-line filter 100 suffers form certain disadvantages. The O-ring can move along the body 102 in use, allowing the filter element to vibrate out of place. Excessive vibration can damage the O-ring. In addition, it has been found that particulates accumulate in the annular chamber 112, and that these particulates can be difficult to remove from the filter element during routine cleaning.

It is, therefore, an object of this invention to provide an improved in-line filter that is less subject to damage by vibration, and that can be cleaned more readily.

SUMMARY OF THE INVENTION

According to this invention, an in-line filter comprises a body having first and second-ends and a passageway extending therebetween. An attachment structure is positioned at each of the ends, shaped to secure the body to adjacent elements. A set of threads is defined around the passageway intermediate the ends. A filter element comprising a mounting portion and a filter portion is mounted to the body. The mounting portion comprises a tubular shaft threadedly mounted in the set of threads, and the tubular shaft is dimensioned to create an annular chamber between the shaft and the body. The filter portion is mounted to the mounting portion at a location remote from the set of threads, and the annular chamber comprises an opening adjacent the filter portion.

In the preferred embodiment described below, the body defines an orifice positioned downstream of the filter element.

BRIEF DESCRIPTION OF THE DRAWINGS

FIG. 2 is an enlarged cross-sectional view of the in-line filter of FIG. 1.

FIG. 3 is an enlarged cross-sectional view of the prior art atomizer of FIG. 1.

FIG. 4 is a cross-sectional view of a prior art in-line filter.

DETAILED DESCRIPTION OF THE PRESENTLY PREFERRED EMBODIMENTS

Figure 1:
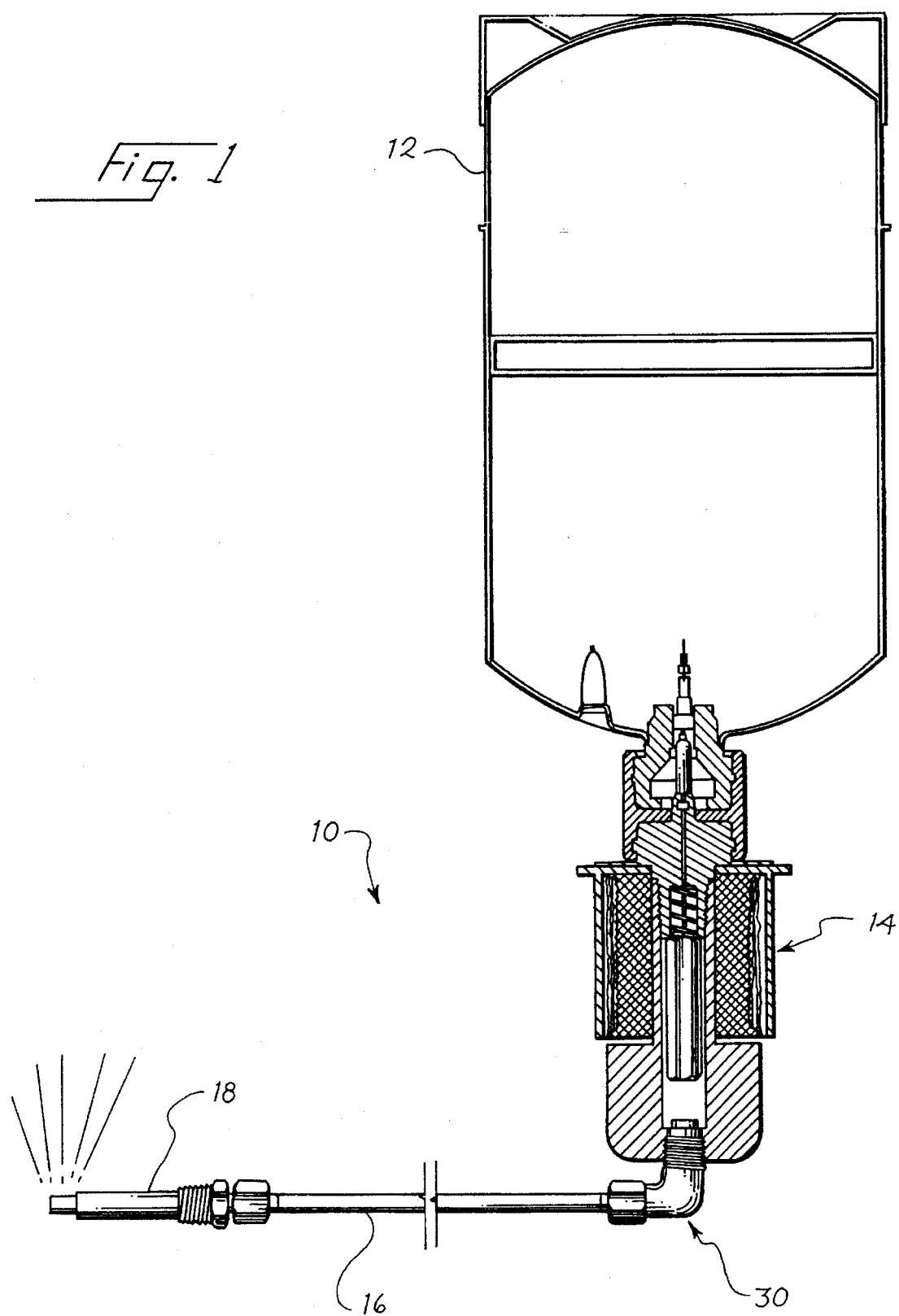
FIG. 1 is a partially sectional view of a starting fluid injection system that incorporates a preferred embodiment of this invention.

Turning now to the drawings, FIG. 1 shows a starting fluid injection system 10 used to inject a starting fluid into an internal combustion engine. The injection system 10 includes a canister 12 of starting fluid and a solenoid valve 14. The solenoid valve 14 is connected to a conduit 16 by means of an in-line filter 30. The distal end of the conduit 16 is connected to an atomizer 18 mounted in an intake manifold of an engine (not shown).

FIG. 3 provides further information regarding the atomizer 18. As shown in FIG. 3, the atomizer 18 includes a fitting 20 which threadedly receives an orifice block 22. A porous sintered bronze filter 24 is mounted in the orifice block 22, upstream of an orifice 26. A nut 28 secures the fitting 22 to the conduit 16 of FIG. 1. It should be understood that except for the in-line filter 30, all of the elements of FIG. 1 are conventional prior art devices that have been illustrated to clarify the environment in which this embodiment is used. See, for example, U.S. Pat. Nos. 4,202,309 and 4,346,683.

Turning now to FIG. 2, the in-line filter 30 includes a body 32 having first and second ends 34, 36. Each of the ends 34, 36 defines an attachment structure such as the illustrated threads. The threads at the first end 34 secure the body 32 to the valve 14 as shown in FIG. 1. The threads at the second end 36 receive a nut as shown in FIG. 1 that couples the body 32 to the conduit 16 of FIG. 1.

As shown in FIG. 2, the body 32 defines a passageway 38 extending between the first and second ends 34, 36. A cup 42 is secured in the passageway 38 intermediate the ends 34, 36, as for example with a press fit. The cup 42 defines a set of threads 40 and an orifice 44.

A filter element 46 is mounted removably in the body 32. The filter element 46 includes a mounting portion 48 which is made up in this embodiment of a tubular shaft 50 and a radially outwardly extending flange 52. The tubular shaft 50 is threaded at one end, and is threadedly connected in a removable manner to the set of threads 40 in the body 32.

The filter element 46 also includes a filter portion 54 which is mounted to the flange 52. The filter portion 54 includes a central protrusion 56 that is received in the tubular shaft 50.

An annular chamber 58 is defined between the tubular shaft 50 and the body 32. This annular chamber 58 includes an annular opening 60 defined between the first end 34 and the flange 52. As shown in FIG. 1, the filter portion 54 is received in the valve 14, and the annular opening 60 is in fluid communication with an interior space of the valve 14.

In use the valve 14 and in-line filter 30 are mounted such that the vertical axis 62 of the in-line filter 30 is oriented vertically. This orientation maximizes the amount of starting fluid that can be dispensed from the canister 12. When it is desired to inject starting fluid into the engine the solenoid valve 14 is energized, thereby releasing starting fluid from the canister 12 into the interior of the valve 14. The starting fluid is filtered by the filter portion 54, and the rate of flow out of the in-line filter 30 is metered by the orifice 44. Starting fluid then passes out of the in-line filter 30 via the conduit 16 to the atomizer 18 for injection into the engine. The filter portion 54 prevents particulates from the valve 14 or the canister 12 from clogging the orifice 44.

When the vertical axis 62 is oriented as described above, it has been found that particulates from the valve 14 tend to pass through the annular opening 60 and to be captured in the annular chamber 58. In this way the accumulation of particulates on the surface of the filter portion 54 is reduced.

The in-line filter 30 provides a number of significant advantages. First, since the filter element 46 is held in place in the body 32 by threads, the need for seals such as O-rings is eliminated. This makes the in-line filter 30 particularly vibration resistant and it substantially eliminates the problem of a filter element 46 sliding out of position. Preferably, the set of threads 40 are formed as imperfect threads in order to hold the filter element 46 in place in a releasable manner.

Additionally, since the filter element 46 is held in place by threads, it is easily removed for cleaning or replacement. The annular chamber 58 traps particles away from the filter portion 54, and the trapped particles can easily be cleaned and removed during routine service. Since the tubular shaft 50 in the annular chamber 58 is non-porous and does not serve as a filter, the accumulation of particles in the annular chamber 58 does not tend to clog the filter.

The following details of construction are provided merely to clarify the configuration of one preferred embodiment. It will, of course, be understood that these as well as other details of the preferred embodiment are provided merely by way of illustration.

In this embodiment the body 32 and the cup 42 are preferably formed of brass, the mounting portion 48 is preferably formed of an alloy of 90% copper and 10% tin, and the filter portion 54 is made up of a porous sintered bronze having a filtration rating of 40 microns and a composition of 6–8% tin and the balance copper. The annular chamber 58 can have an inner diameter of 4.17 mm and an outer diameter of 5.59 mm. The height of the annular opening 60 measured between the flange 52 and the first end 34 can be 0.38 mm. The set of threads 40 is preferably shaped to ensure that even when the filter element 46 is tightened in position, the annular opening 60 remains open. Preferably between 4½–5½ full threads are provided in the set of threads 40.

It should be understood that a wide range of changes and modifications can be made to the preferred embodiment described above. For example, certain embodiments of the in-line filter of this invention do not include a cup 42 or an orifice 44. Additionally, the filter portion 54 can include other types of filters such as screen or wire mesh. The attachment structures on the first and second ends 34, 36 can be adapted as appropriate for the particular application, and can, for example, include captured nuts, flanges, or the like.

It is, therefore, intended that the foregoing detailed description be regarded as illustrative rather than limiting. It is the following claims, including all equivalents, which are intended to define the scope of this invention.

I claim:

1. In a starting fluid injection system of the type comprising a starting fluid canister valve, a conduit coupled to the valve, and an atomizer coupled to the conduit, the improvement comprising:

an in-line filter mounted between the valve and the atomizer, said filter comprising a body and a filter element;

said body comprising a first, inlet end and a second, outlet end, a passageway extending therebetween in communication with the conduit, and a set of threads around the passageway intermediate the ends;

said filter element comprising a mounting portion and a filter portion, said mounting portion comprising a tubular shaft threadedly mounted in the set of threads, said tubular shaft dimensioned to create a chamber between the shaft and the body, said filter portion mounted to the mounting portion at a location remote from the set of threads, said chamber comprising an opening adjacent the inlet end, said chamber disposed between the threads and the inlet end.

2. An in-line filter comprising:

a body comprising a first, inlet end and a second, outlet end, a passageway extending therebetween, an attachment structure at each of the ends shaped to secure the body to adjacent elements, and a set of threads around the passageway intermediate the ends;

a filter element comprising a mounting portion and a filter portion, said mounting portion comprising a tubular shaft threadedly mounted in the set of threads, said tubular shaft dimensioned to create a chamber between the shaft and the body, said filter portion mounted to the mounting portion at a location adjacent the inlet end and remote from the set of threads, said chamber comprising an opening adjacent the inlet end, said chamber disposed between the threads and the inlet end.

3. The invention of claim 1 or 2 wherein the filter portion comprises a porous sintered bronze filter.

4. The invention of claim 1 or 2 wherein the tubular shaft is non-porous.

5. The invention of claim 1 wherein the body is mounted to the canister valve.

6. An in-line filter comprising:

a body comprising first and second ends, a passageway extending therebetween, an attachment structure at each of the ends shaped to secure the body to adjacent elements, and a set of threads around the passageway intermediate the ends;

a filter element comprising a mounting portion and a filter portion, said mounting portion comprising a tubular shaft threadedly mounted in the set of threads, said tubular shaft dimensioned to create a chamber between the shaft and the body, said filter portion mounted to the mounting portion at a location remote from the set of threads, said chamber comprising an opening adjacent the filter portion;

wherein the in-line filter further comprises an orifice defining element along the length of the passageway, said orifice defining element positioned such that the set of threads is disposed between the filter element and the orifice defining element along the passageway.

7. An in-line filter comprising:

a body comprising first and second ends, a passageway extending therebetween, an attachment structure at each of the ends shaped to secure the body to adjacent elements, and a set of threads around the passageway intermediate the ends;

a filter element comprising a mounting portion and a filter portion, said mounting portion comprising a tubular shaft threadedly mounted in the set of threads, said tubular shaft dimensioned to create a chamber between the shaft and the body, said filter portion mounted to the mounting portion at a location remote from the set of threads, said chamber comprising an opening adjacent the filter portion;

wherein the mounting portion further comprises a flange extending radially outwardly from the tubular shaft adjacent the body, said opening being annular in shape and defined between the flange and the body.

8. The invention of claim 7 wherein the filter portion is mounted to the mounting portion at the flange.

9. The invention of claim 8 wherein the filter portion comprises a central protrusion, and wherein the central protrusion is received in the tubular shaft.

10. The invention of claim 6 or 7 in combination with a starting fluid injection system comprising a starting fluid canister valve, a conduit coupled to the valve, and an atomizer coupled to the conduit, wherein the body is mounted between the valve and the atomizer.

11. In a starting fluid injection system of the type comprising a starting fluid canister valve, a conduit coupled to the valve, and an atomizer coupled to the conduit, the improvement comprising:

an in-line filter mounted between the valve and the atomizer, said filter comprising a body and a filter element;

said body comprising inlet and outlet ends, a passageway extending therebetween in communication with the conduit, and a set of threads around the passageway intermediate the ends;

said filter element comprising a mounting portion and a filter portion, said mounting portion comprising a tubular shaft threadedly mounted in the set of threads, said tubular shaft dimensioned to create a particulate capturing chamber between the shaft and the body, said filter portion mounted to the mounting portion at a location remote from the set of threads, said particulate capturing chamber comprising an opening adjacent the filter portion, said particulate capturing chamber in fluid communication with the inlet end via the opening;

wherein the particulate capturing chamber defines a vertically oriented axis, and wherein the filter portion is positioned above the particulate capturing chamber, adjacent the inlet end, said particulate capturing chamber operating to capture particulates entering the passageway at the inlet end.

\* \* \* \* \*